(12) United States Patent
Muller

(10) Patent No.: US 6,732,431 B2
(45) Date of Patent: May 11, 2004

(54) METHOD OF MANUFACTURING AN ELECTRICAL CONNECTION TO A PANEL

(75) Inventor: Rudolf Muller, Frankfurt am Main (DE)

(73) Assignee: Profil Verbidungstechnik GmbH & Co. KG, Friedrichsdorf (DE)

(*) Notice: Subject to any disclaimer, the term of this patent is extended or adjusted under 35 U.S.C. 154(b) by 0 days.

(21) Appl. No.: 10/292,102

(22) Filed: Nov. 12, 2002

(65) Prior Publication Data

US 2003/0066181 A1 Apr. 10, 2003

Related U.S. Application Data

(63) Continuation of application No. 09/422,518, filed on Oct. 21, 1999, now abandoned.

(30) Foreign Application Priority Data

Oct. 21, 1998 (DE) .......................................... 198 48 617

(51) Int. Cl.[7] .......................... H01R 43/16; F16B 37/04
(52) U.S. Cl. .......................... 29/874; 29/432.2; 29/512; 29/520; 29/876; 29/458; 411/179; 411/183
(58) Field of Search .......................... 29/874, 825, 512, 29/458, 520, 432.2, 243.517, 525.05, 876, 515; 411/178, 183, 180, 179; 439/801, 883

(56) References Cited

U.S. PATENT DOCUMENTS

| | | | |
|---|---|---|---|
| 3,926,236 A | * 12/1975 | Pouch et al. | 151/41.73 |
| 4,650,274 A | 3/1987 | Schmid | 339/263 |
| 6,004,087 A | * 12/1999 | Muller | 411/180 |
| 6,357,110 B1 | * 3/2002 | Shipp et al. | 29/825 |

FOREIGN PATENT DOCUMENTS

| | | | |
|---|---|---|---|
| DE | 2353913 | 5/1974 | ........... F16B/37/04 |
| DE | 2844384 | 4/1980 | ........... H01R/4/34 |
| DE | 3019070 | 5/1981 | ........... F16B/37/06 |
| DE | 3042772 | 7/1981 | ......... F16B/39/282 |
| DE | 3404118 | 4/1985 | ........... B23P/11/00 |
| DE | 3446978 | 8/1985 | ........... B23P/11/00 |
| DE | 3835556 | 4/1990 | ........... F41A/3/32 |
| EP | 0533822 | 3/1993 | ........... H02H/7/20 |
| EP | 0540030 | 5/1993 | ........... H01R/4/64 |
| EP | 0663247 | 7/1995 | ........... B21D/53/24 |
| EP | 0669473 | 8/1995 | ........... F16B/37/06 |
| EP | 0759510 | 2/1997 | ........... F16B/37/06 |
| EP | 0842733 | 5/1998 | ........... B23P/19/06 |
| WO | WO 9319890 | 10/1993 | ........... B23P/19/00 |

OTHER PUBLICATIONS

German language Search Report dated Jun. 24, 1999, relating to German Patent App. No. 198 48 617.0 and an English translation thereof.

* cited by examiner

Primary Examiner—Carl J. Arbes
Assistant Examiner—Minh Trinh
(74) Attorney, Agent, or Firm—Howard & Howard

(57) ABSTRACT

The disclosure relates to a method of producing an electrical connection to a sheet metal part, in particular to a sheet metal part having a non-conductive or poorly conductive protective layer, using a hollow fastener element which is mounted by means of the riveting or pierce riveting process to the sheet metal part, wherein a terminal lug is attached by means of a screw to the hollow fastener element, i.e. to the sheet metal part. The method is characterized in that the screw which is screwed into the hollow attachment element penetrates the sheet metal part and forms or reforms a thread in the sheet metal part. The disclosure furthermore relates to a component assembly which is produced in accordance with the said method.

7 Claims, 7 Drawing Sheets

METHOD OF MANUFACTURING AN ELECTRICAL CONNECTION TO A PANEL

This is a continuation of application Ser. No. 09/422,518, filed Oct. 21, 1999 now abandoned.

BRIEF SUMMARY OF THE INVENTION

The present invention relates to a method of manufacturing an electrical connection to a sheet metal part, in particular to a sheet metal part having a non-conductive or poorly conductive protective layer, using a hollow fastener element which is attached by means of a riveting process or pierce and riveting process to the sheet metal part, wherein a terminal lug is attached by means of a screw to the hollow fastener element, i.e. to the sheet metal part. The invention furthermore relates to a component assembly comprising a sheet metal part, in particular a sheet metal part having a non-conductive or poorly conductive protective layer, and a hollow fastener element riveted to the sheet metal part and designed to receive a screw which secures a terminal lug.

The requirements for electrical connections to sheet metal parts, in particular but not exclusively in the sense of earth connections to parts of motorcar coachwork prove to be increasingly more difficult.

On the one hand, high quality electrical connections are necessary, so that the ever more complicated electronic devices of motor vehicles function correctly, in particular safety-critical devices, such as for example in airbag trigger systems. On the other hand, there is an increasing trend to processing sheet metal parts which are provided with a protective layer which has only a poor electrical conductivity or indeed no electrical conductivity at all.

In the past a bolt element for the attachment of earth connections has proved itself, as is protected in the European patent EP-B-540 030.

Nowadays, an electrical connection is, however, also required which can be realised by means of a nut element. Whereas one could, in the past, rely on the fact that the attachment of a fastener element having correspondingly shaped features to a sheet metal part would result in these shaped features injuring any protective coating which was present, so that the desired electrical connection arose, it is nowadays increasingly more difficult to ensure this with sheet metal parts which are pre-painted. The corresponding protective coatings are namely so conceived that they can also participate in the most diverse shaping methods without being injured. Such coatings are not even damaged in deep-drawing processes. The danger thus exists when attaching fastener elements by riveting processes, or by pierce and riveting processes, that a non-adequate electrical connection arises between the fastener element and the sheet metal part. One therefore has to fear transition resistances arising which prevent the desired electrical function being ensured.

Moreover, sheet laminates, for example "Bondal" registered mark of the Hoesch company) are being used nowadays, consisting of two metal layers of steel and/or aluminium with an intermediate layer of plastic. Such sheet metal laminates have very good damping characteristics are, however, only weldable under very difficult conditions, so that the production of earth connections is only possible via mechanically attached fastener elements, with an earth connection to both sheet metal components being necessary despite the insulating plastic layer which is present.

OBJECT OF THE INVENTION

The object of the present invention is to provide assistance here and to ensure that when using hollow fastener elements, such as fastener nuts, a quality high-value electrical connection arises between a terminal lug or connection terminal and the sheet metal part, even in series manufacture.

This object is satisfied methodwise by a method of the initially named kind in that the screw which is screwed into the hollow fastener element penetrates the sheet metal part and forms or reforms a thread in the sheet metal part.

A corresponding component assembly in accordance with the invention is characterised in that the sheet metal part has a hole which is aligned with the passage of the hollow fastener element which receives the screw and the hole has a diameter or a minimum transverse dimension which corresponds at least substantially to the core diameter of the thread of the screw or is fractionally smaller than the latter.

In general, the sheet metal part is pre-holed prior to introduction of the screw for which several possibilities exist. On the one hand, the pre-holing can take place by means of a preceding hole punch during the attachment of the fastener element. In this connection, for example a modified embodiment of the method of the European patent application EP-A-0 759 510 can be used, as will be later explained.

It is sufficient to note here that in the attachment of the hollow fastener element the hole punch, which is guided concentrically to the central passage of the hollow fastener element, produces a corresponding hole in the sheet metal part before the die button supporting the sheet metal part takes care of the shaping of the sheet metal part into a hollow cavity of the fastener element.

If the hollow fastener elements are introduced into the sheet metal part in a progressive die tool set, then the pre-holing of the sheet metal part can take place in one station of the progressive die tool set, while the attachment of the hollow fastener element can take place in alignement with the so produced hole in a subsequent station of the progressive die tool set.

The sheet metal part can, however, also be post-holed, for example in a variant of the method which is described in EP-B-0 533 822 or EP-A-0 669 473. In a method of this kind, the connection of the fastener element to the sheet metal part is first brought about without piercing the sheet metal part. The follow-up tool punch is subsequently guided through the central passage of the fastener element in order to make the corresponding hole in the sheet metal part.

When using a progressive die tool set for the attachment of the hollow fastener element to sheet metal parts the attachment of the fastener elements can take place in one station of the progressive die tool set, whereas the post-holing is carried out in a subsequent station of the progressive die tool set.

In a preferred embodiment a circular hole is formed in the sheet metal part by the hole punch, and indeed with a diameter which corresponds at least substantially to the core diameter of the screw which is fractionally smaller than the latter. The sense of this design of the hole is that the screw, which can be designed as a thread-forming or thread-cutting screw, cuts or forms a thread in the sheet metal part, and optionally also in the hollow fastener element, with the thread in the sheet metal part being so formed that an intimate form-fitted connection is achieved, i.e. the sheet metal part is moulded into the thread of the screw.

A circular hole is, however, not absolutely essential. A hole punch could be used which has a polygonal or star-like or splined cross-section. A high quality electrical connection can be ensured via the screw to the terminal lug, i.e. to the corresponding connection terminal through the corners or teeth of the edge of the aperture which arises in this way. Any outward bending of the teeth or tips which arise in this way can also lead, during the attachment of the terminal lug to the sheet metal part, to an injury to the surface of the terminal lug, whereby any oxide layers are broken open and a high quality electrical connection is achieved.

Particularly preferred embodiments of the method and component assembly of the invention are to be found in the subordinate claims.

The invention will explained in the following in more detail with reference to the embodiments while referring to the drawings. The FIGS. 1 to 8 correspond essentially to those of EP-A-0 759 510 A1, however, these Figures have been modified in order to show the modified form of the hole punch, the modified form of the aperture produced by means of the hole punch and the effect on the protective coating which is present on the sheet metal part. The drawings show:

Figure 1:
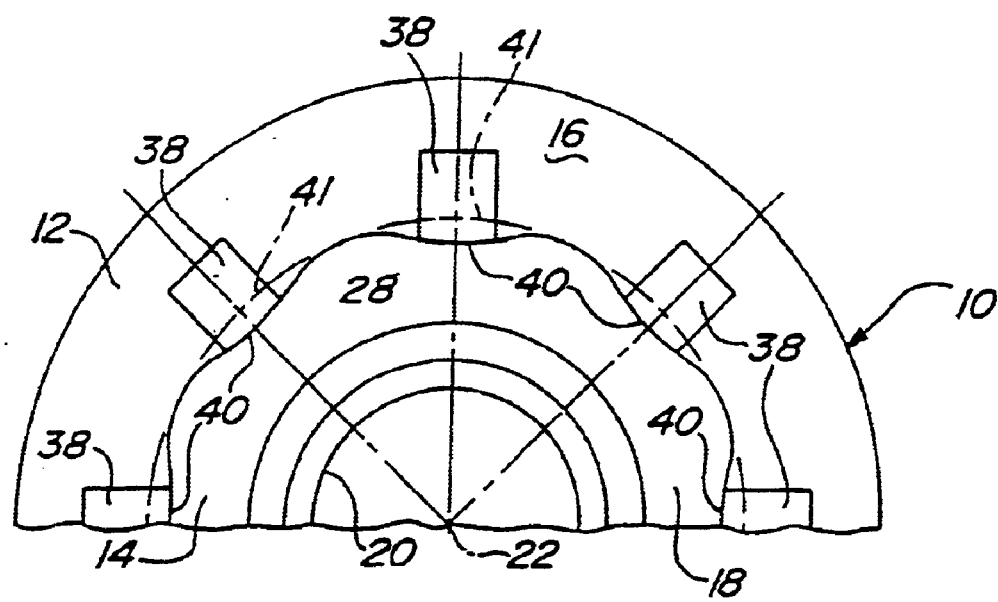
FIG. 1 a plan view on the end face of the hollow fastener element which can be used for the purpose of the invention, with only one half of the fastener element being shown for the sake of simplicity, FIG. 2 a partly sectioned side view of the fastener element of FIG. 1, FIG. 3 a schematic illustration of the first phase of the method of the invention for the attachment of the fastener element of FIGS. 1 and 2 to a plate-like component, with the FIG. 3a showing the end face of the die button that is used, FIG. 4 a later phase of the method of the invention shortly before the holing of the plate-like component, FIG. 5 a later phase of the method of the invention immediately after the holing of the plate-like component, FIG. 6 a still later phase of the method of the invention during the forming of the plate-like component, FIG. 7 the end of the method of the invention after the attachment of the fastener element to the plate-like component, with FIG. 7A showing the arrangement of the die button in the lower tool, FIG. 8 a partly sectioned side view of the component assembly of the invention comprising the fastener element and a sheet metal part, FIG. 9 the attachment of a terminal lug onto the component assembly in accordance with FIG. 8 produced from the fastener element and the sheet metal part, FIG. 10 the finished connection, FIG. 11 a detailed representation of the electrical connection between the screw and the sheet metal part, FIG. 12 an alternative possibility for the attachment of a terminal lug to the component assembly of FIG. 8, FIG. 13 a partly sectioned view of the attachment of the hollow element to a sheet metal part in accordance with the European patent EP-B-0 533 822, but with a modified hole punch and a modified die button in order to produce a component assembly which is designed in accordance with the present invention, and FIG. 14 a schematic illustration of the attachment of a terminal lug to the component assembly of FIG. 13.
Figure 2:
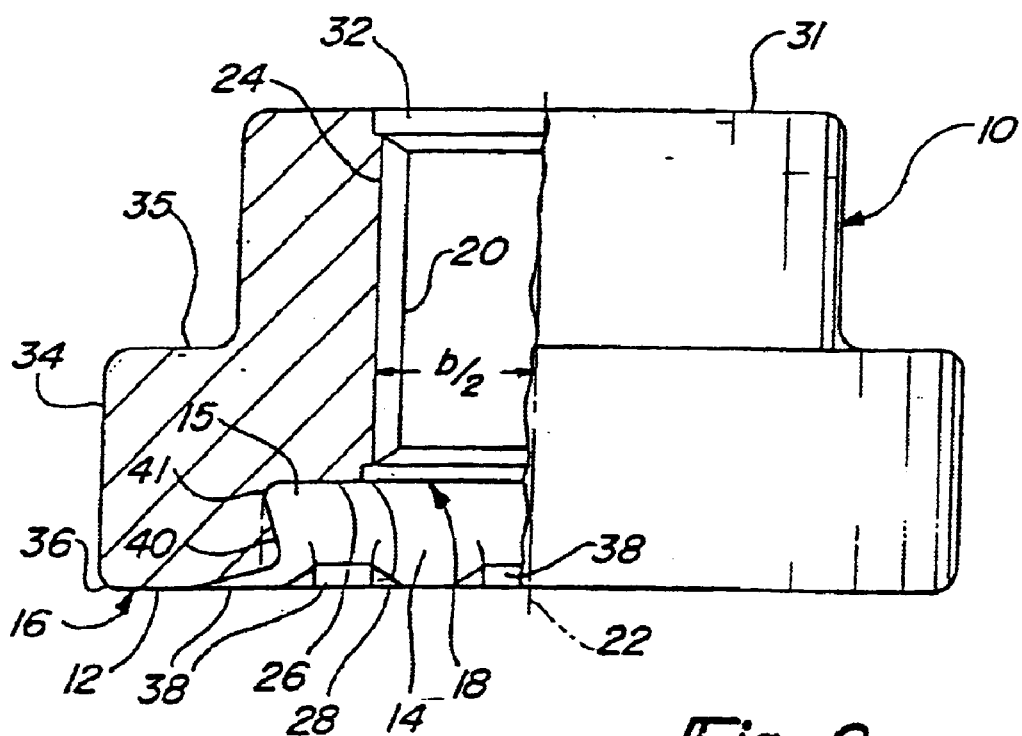

In accordance with FIGS. 1 and 2, the hollow fastener element 10 of EP-A-759 510 comprises a substantially cylindrical body of metal having an end face 12 which, after the attachment of the element to a plate-like component, is disposed adjacent the latter. The end face 12 has a ring-like recess 14 which is arranged within a raised ring-like contact surface 16, with the base surface 18 of the ring-like recess extending up to the bore 20 of the fastener element 10. The bore 20 has a central axis 22 which simultaneously represents the longitudinal axis of the fastener element and which is here formed as a threaded bore with a thread 24, so that the fastener element shown here is a nut element.

The base surface 18 of the ring-like recess 14 merges via a ring shoulder 26 into a ring surface 28, with the outer diameter of the ring surface 28 being fractionally larger than the outer diameter D of the thread 24 provided in the bore 20. One notes that the bore 20, i.e. the thread 24, the ring surface 28, the ring shoulder 26 and the ring-like recess 14 as well as the contact surface 12 lie coaxial to the central axis 22 of the fastener element 10. The further end face 30 of the fastener element is flat in this embodiment and merely provided with a small countersink 32 which forms a clean transition to the thread 24.

The stepped jacket surface 34 of the fastener element merges via a small radius 36 into the end face 12, with this radius 36 preferably being made smaller than 0.5 mm, for example 0.3 mm.

In the ring-like contact surface eight recesses 38 are provided in this example which, as can be seen from FIG. 2, are made approximately wedge-shaped and have their greatest depth at the transition into the side wall 15 of the ring-like recess 14. In plan view, the recesses 38 are approximately rectangular as can be seen from FIG. 1. These recesses are produced during cold forming during the manufacture of the nut element and the corresponding deformation of the hollow body blank leads to bead-like projections 40 in the side wall of the ring-like recess 14, with these projections leading to local undercuts 41 in the side wall of the ring-like recess 14, as can clearly be seen at the left-hand side of FIG. 2.

All materials which achieve strength values of class 8 in the context of cold forming are suitable as materials for the fastener elements, for example a 35 B2 alloy in accordance with DIN 1654. The so formed fastener elements and nut elements are suitable, amongst other things, for all commercially available steel materials for drawing quality sheet metal parts and also for aluminium or other alloys. The nuts can also be formed in other materials, for example in an aluminium alloy, in particular in an aluminium alloy of higher strength.

It will be understood that in FIG. 2 the design of the nut element at the right-hand side of the central axis 22 is identical to that at the left-hand side.

The manner of attachment of the fastener element in accordance with FIGS. 1 and 2 in a plate-like component in the form of a sheet metal part 42 will be explained in the following in more detail with reference to FIGS. 3 to 8.

Figure 3:
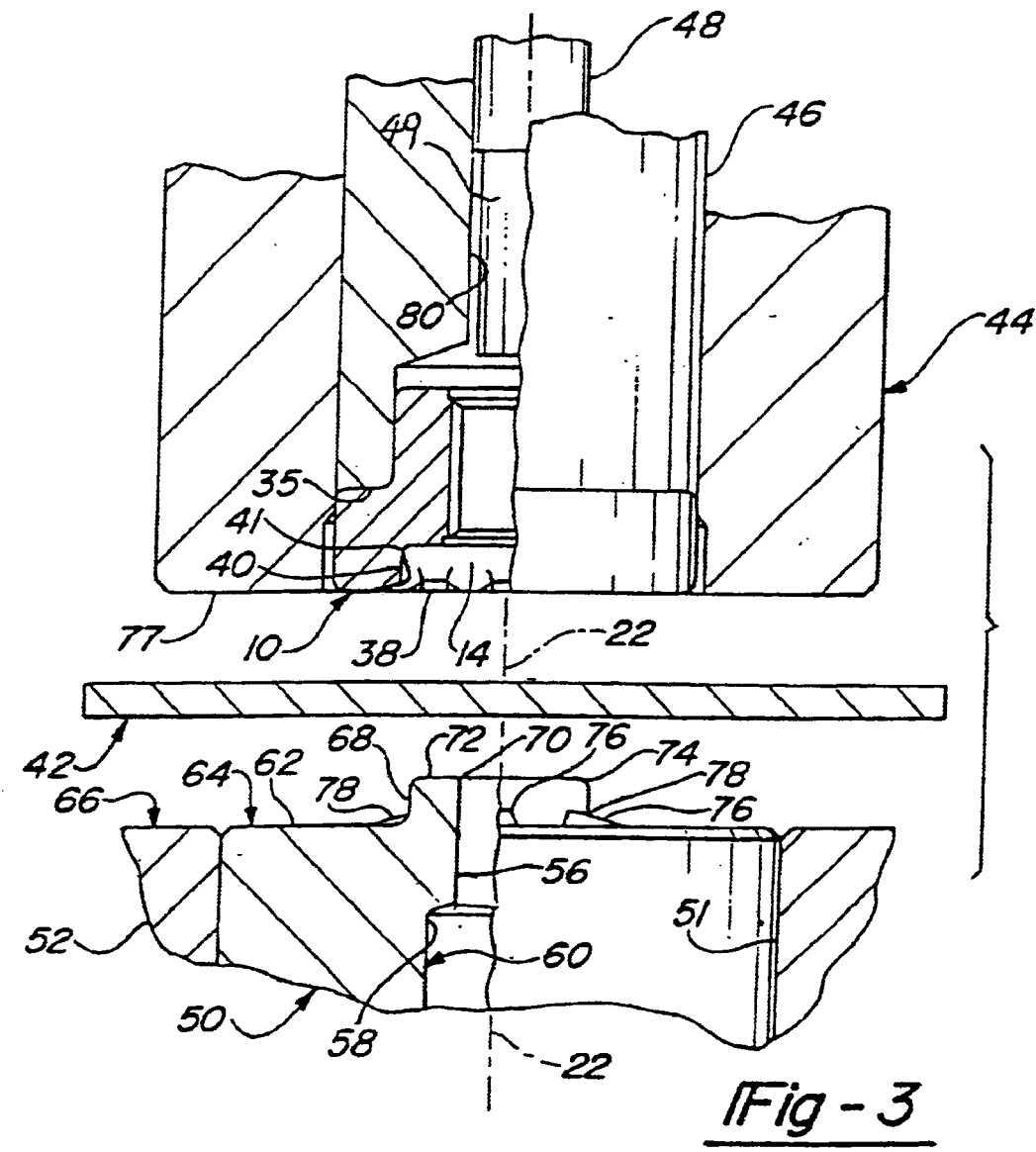
Figure 3A:
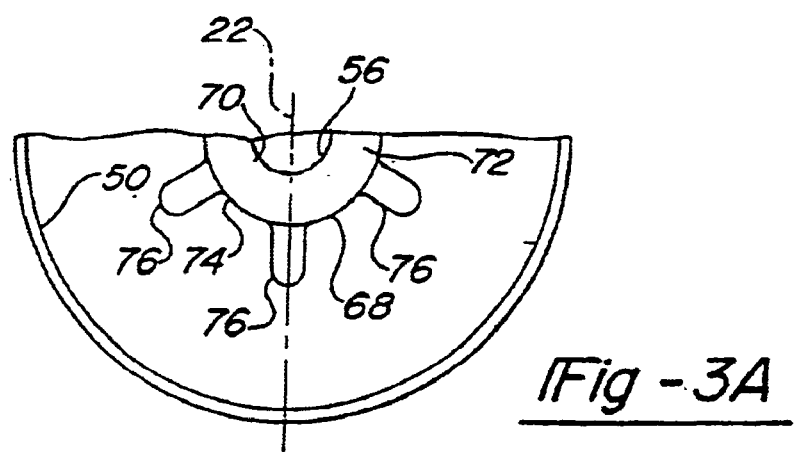

In FIG. 3 the fastener element 10 in accordance with the invention is shown in an only partly illustrated setting head 44 which has a plunger 46 and also a hole punch 48 arranged coaxial to the plunger 46. A setting head of this kind is known in principle from the above mentioned German documents, i.e. German patent 34 46 978 and German laying-open print 38 35 556.3. The hole punch 48, which is here realised as a so-called preceding hole punch, has at its front end a cylindrical section 49 of smaller diameter which carries out the actual hole making process, as will be explained in more detail later.

Figure 7:
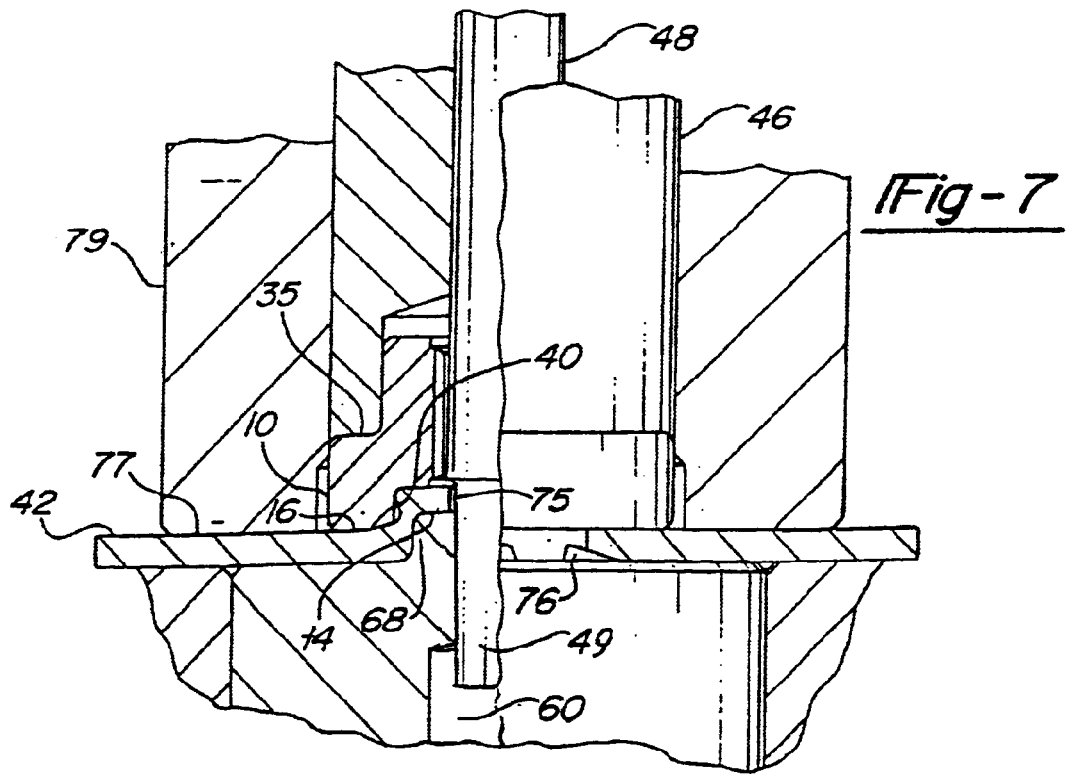
Figure 7A:
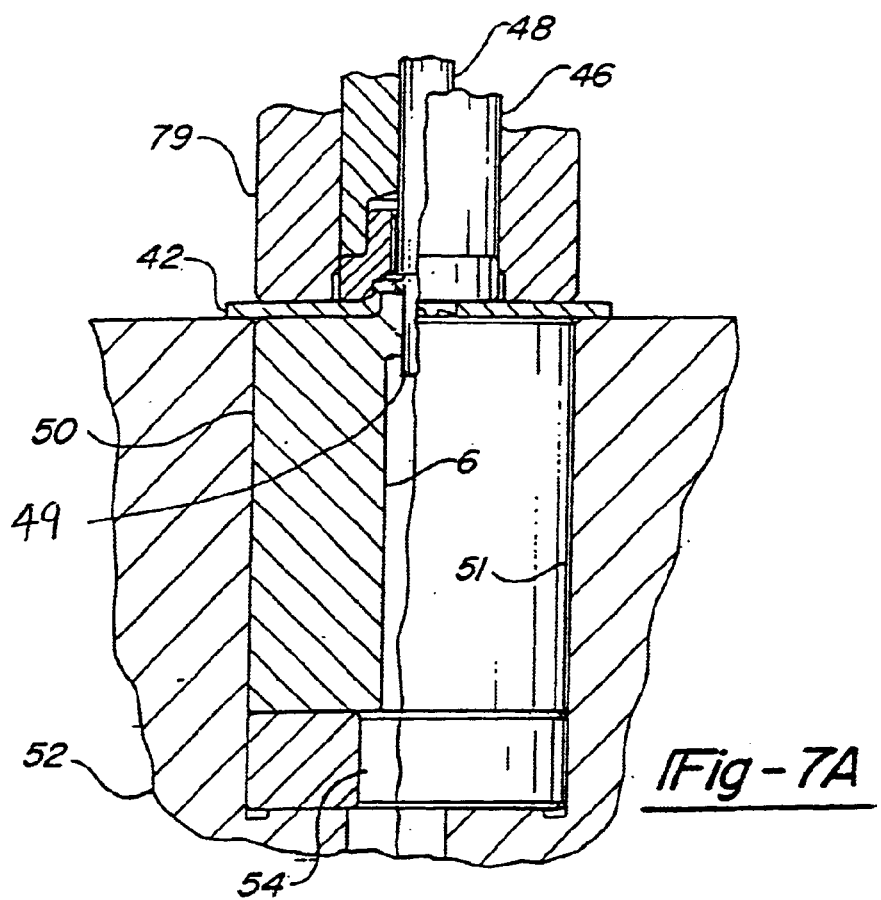

Beneath the sheet metal part 42 there is a die button 50 which, as shown in FIG. 7A, is for example inserted as a cylindrical component into a cylindrical bore 51 of a lower tool 52 of a press and is held at the correct level flush with the surface of the lower tool 52 by means of a spacer 54. The die button 50 has a central bore 56 which merges via a ring shoulder 58 into a larger bore 60. The end face 62 of the die button 50 has a flat surface 64 which lies flush with the surface 66 of the lower tool 52. Furthermore, the end face of the die button 50 has a hole-forming punch section 68. The bore 56 which forms the hole of the hole-forming punch projection 68 has a ring-like cutting edge 70, having an inner diameter which corresponds to the diameter of the cylindrical section 49 of the hole punch 48, i.e. is only fractionally larger than it, as is customary with hole punches. This diameter is significantly smaller than the core hole diameter of the hollow fastener element, i.e. of the thread cylinder 24. The reason for this will be explained later. The end face 72 of the die button which is arranged coaxial to the longitudinal axis 22 and which lies at least substantially perpendicular to this axis has a rounded drawing edge 74 at the transition to the jacket surface of the hole-forming punch section 68.

A plurality of noses 76 are arranged at intervals around the hole-forming punch section, with six such noses being provided in this embodiment which are arranged uniformly around the hole-forming punch section 68. The noses 76 have an inclined surface 78 and are formed in raised manner, both at the jacket surface of the hole forming punch projection 68 and also at the planar end face 64 of the die button 50.

The noses 76, which are as a whole rounded at all surfaces, are made somewhat narrower than the recesses 38 in the ring-like contact surface 16 of the nut element 10. Through the use of the use of the same reference numeral 22 it is made clear that the hole punch 48, the punch 46, the lower surface 77 of the setting head, the hole element 10 and the die button 50 of the lower tool 52 as well as the bore 56 and the bore 60 of the die button and finally also the through-bore of the spacer 54 are all coaxially arranged.

The setting head 44 is itself arranged in a manner known per se at the upper tool of a press and is designed in the customary way and using the customary means so that the respective nut elements 10 pass via an inclined passage into the bore 80 of the setting head 44 and are subsequently guided by means of the plunger 46 during the closing of the press up to the end face of the setting head. The nut elements can also be held during this movement for which apparatuses are known, for example from the PCT application with the publication number WO 93/19890.

Figure 4:
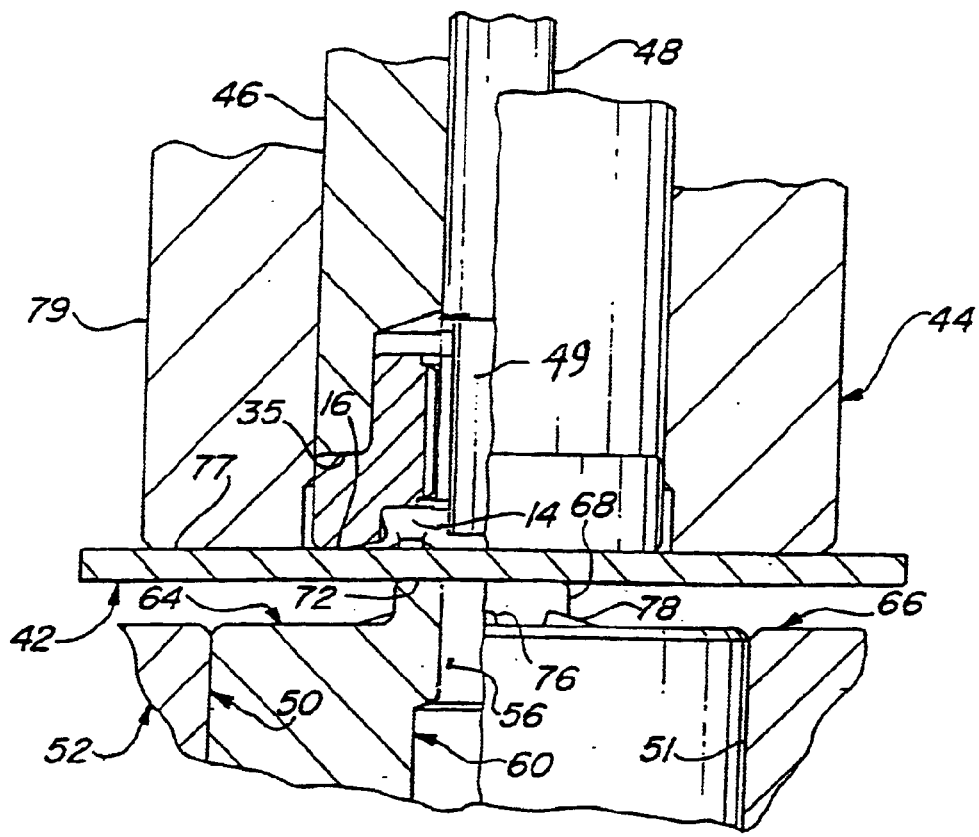
Figure 5:
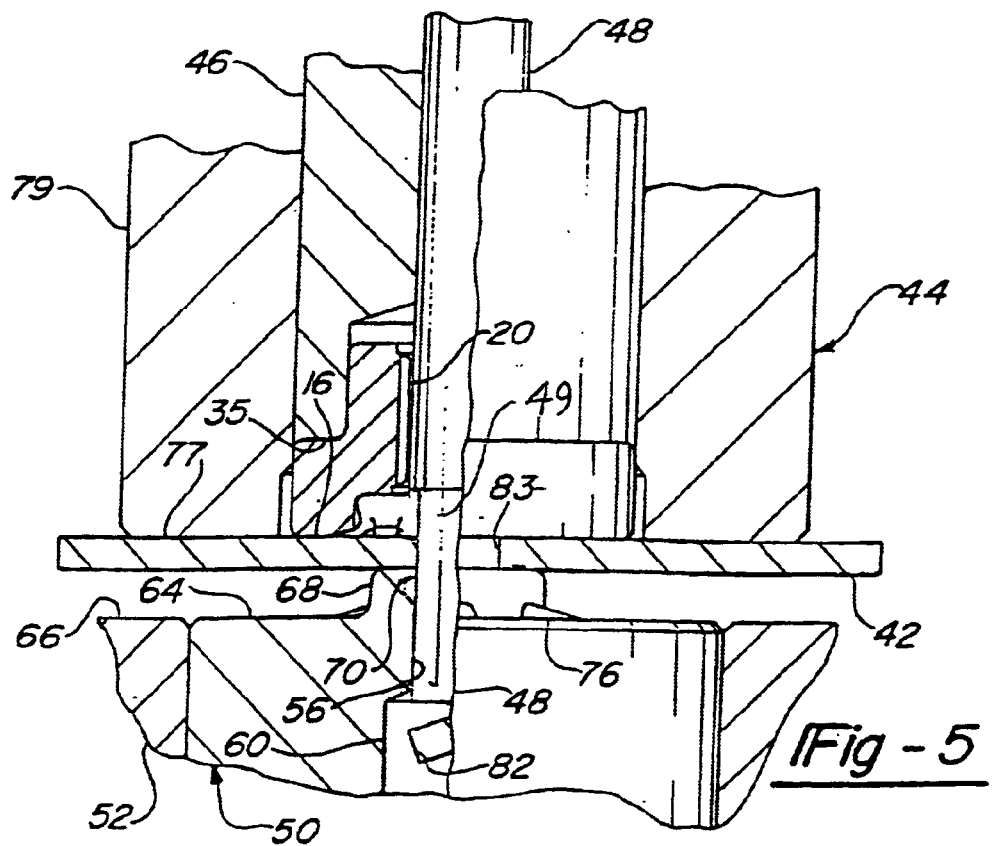

On closing of the press, for example for the shaping of the sheet metal part by the lower tool 52 in combination with an upper non-illustrated tool, the setting head moves out of the position of FIG. 3 into the position of FIG. 4. The lower end face 77 of the setting head 44 comes in this manner into contact with the sheet metal part 42 and this is in turn pressed against the end face 72 of the die button 50. A further downward movement of the housing 79 of the setting head, which serves as a hold-down member for the sheet metal part 42, is prevented as this stage, the housing 79 of the setting head deflects rearwardly somewhat relative to the downwardly moving tool of the press. This also applies to the plunger 46 which advantageously presses against the ring shoulder 35 of the fastener element, and not against the end face 31, whereby the danger of damaging the thread 34 is effectively avoided. The upper tool of the press, however, drives the hole punch further downwardly, first of all into the position of FIG. 5. During this, the hole punch section 49 cuts a slug 82 out of the sheet metal part 42 in conjunction with the cutting edge 70 of the hole-forming punch section 68 of the die button 50, as is shown in the sequential drawing of FIG. 5. In this manner a punched hole 83 arises in the sheet metal part 42. One can see from this drawing that the hole punch section 49 is slidingly received in the bore 56 of the die button 50.

The slug 82 can be disposed of through the bore 60 of the die button 50, with the large diameter of this bore 60 in comparison to the bore 56 ensuring that the slug easily moves under gravity and does not become caught or stuck.

Figure 6:
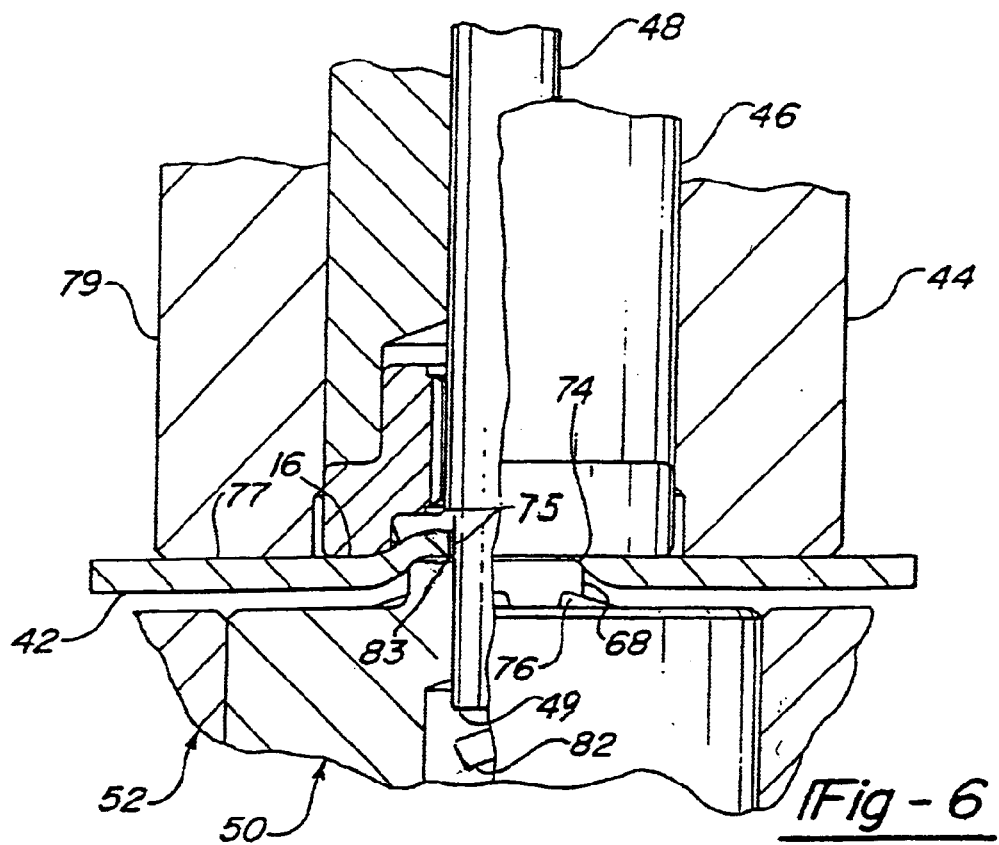

During the further closing movement of the press the housing 79 of the setting head 44 and the plunger 46 move further downwardly together, as is shown in FIG. 6, whereby the hole-forming punch section 68 or more precisely stated the rounded drawing edge 74 of the hole-forming punch projection forms a collar 75 from the sheet metal material around the punched hole 83 while widening the punched hole 83. This deformation is continued up to the end stage as is shown in FIG. 7 and one can see there from FIG. 7 that the hole-forming punch projection 68 has so deformed the sheet metal material of the collar 75 that this is pressed in form-fitted manner into the ring-shaped recess 14 of the fastener element and into the undercut 40.

The diameter of the punched hole 83 before the above mentioned broadening corresponds to the diameter of the cylindrical section 49 of the hole punch 48 and is selected so that, after the broadening, the broadened punched hole has an inner diameter which is at least substantially identical to the core diameter of the thread cylinder or fractionally smaller than the latter.

Through the different number of noses 46 in comparison to the number of recesses 38 in the ring-like contact surface 16 of the fastener element it is ensured that at least one nose comes into full alignment with a recess 38, and indeed without measures having to be taken in order to ensure the rotary position of the fastener element around the central axis 22. An at least partial alignment with the noses of the die button can also be expected for other recesses 38, so that a form-fitted contact also arises here, whereby the security against rotation is ensured.

Figure 8:
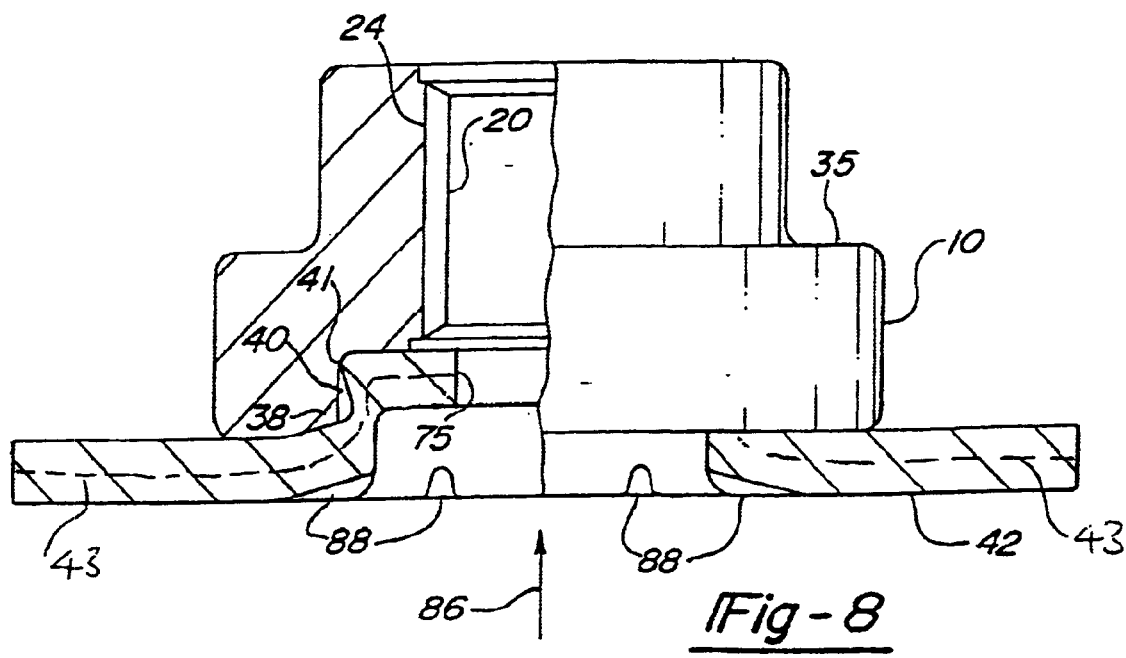

Since the bead-like projections 40, which form the undercuts, likewise lead to a corrugated surface of the side wall of the ring-shaped recess 14, the form-fitted contact of the sheet metal part against this side wall likewise makes a significant contribution to the rotational security of the connection. In accordance with the state of the method of FIG. 7, the press opens again and the workpiece 42 with the attached fastener element is expelled from the press or removed from the press and then presents itself as is shown in FIG. 8. One can see from FIG. 8 that the inner diameter of the collar 75 of the sheet metal part 42 is somewhat smaller than the inner diameter of the thread 24, so that the sheet metal part can initially hinder the insertion of a bolt in contrast to the previous function of the fastener element. The bolt which is fitted into the thread 24 is normally introduced in the arrow direction 86 of FIG. 8 and normally serves to secure a second sheet metal component to the sheet metal component 42. The recesses 88 produced in the sheet metal part by the noses 76 are also evident in FIG. 8.

The sheet metal part 42 of FIG. 8 is subdivided by a broken line 43, with this line pointing to the possibility of using sheet metal laminates, with the line 43 representing the plastic layer between two sheet metal components of steel and/or aluminum and the panel 42 includes a nonconductive or poorly conductive protective layer 35.

Although the fastener elements shown here all have a right-cylindrical jacket surface, i.e. all have a circular cross-section in plan view, other cross-sectional shapes, for example polygonal shapes or oval-shapes or cross-sectional shapes having grooves can also be used. Moreover, the term "ring-like" will be so understood that this not only includes circular rings, but rather also ring shapes which differ somewhat from the circular ring shape, such as for example a polygon.

The sidewall 41 of the ring-like recess 14 can also represent a polygon or a multisided figure.

Figure 9:
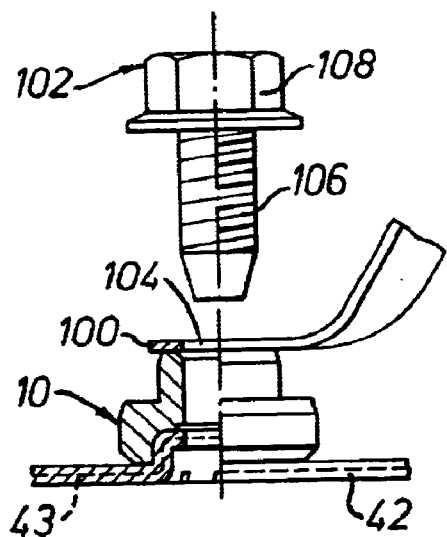

FIG. 9 shows how a terminal lug 100 is mounted by means of a screw 102 onto the component assembly comprising the hollow fastener element and the sheet metal part 42. In distinction to the hollow fastener element of the previous Figures, an embodiment is shown here, simply as an alternative, in which the threaded cylinder 24 is not yet present, i.e. the corresponding central passage of the fastener element has an inner diameter corresponding to the core diameter of the thread. The terminal lug 100, which can also be a connection terminal, for example realised as a fastening lug for an ignition coil, has a hole 104 with a diameter somewhat larger than the outer diameter of the thread part 106 of the screw 102, so that the screw can be passed through the terminal lug 104 without resistance. The screw 102 is a so-called Taptite (registered mark) screw which is available in the market place and represents a thread-forming screw.

The thread-forming screw 102 is placed onto the hollow fastener element and screwed into the latter by means of a suitable tool which engages on the head part 108 of the screw.

The thread turns of the screw form, during the screwing-in movement, a gap and settlement-free connection both with the fastener element and also with the hole walls of the sheet metal component and thus produce an intimate contact with the fastening screw for the earth cable. That is to say, the electrical connection is produced from the cable lug into the screw and from the threaded part of the screw into the sheet metal part. In this connection it is unimportant whether the fastener element 10 is itself coated with a paint or merely has a metallic protective coating against rust. The electrical connection between the screw and the terminal lug can optionally be improved by customary means, for example by a spring washer equipped with points.

It is not absolutely essential that the screw itself forms the thread in the hollow fastener element. The fastener element 10 can, as shown in FIGS. 1 to 8, be realised as a nut element and would then only serve for the guidance of the screw which, however, would have to cut the thread in the sheet metal part. However, it would also be possible to preform the thread in the sheet metal part, optionally undersized, and then only to bring it into the final form when the screw is screwed in.

Figure 10:
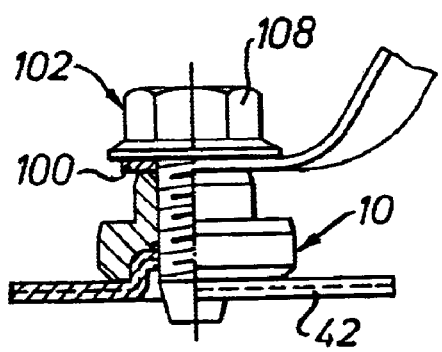

FIG. 10 shows the finished connection.

Figure 11:
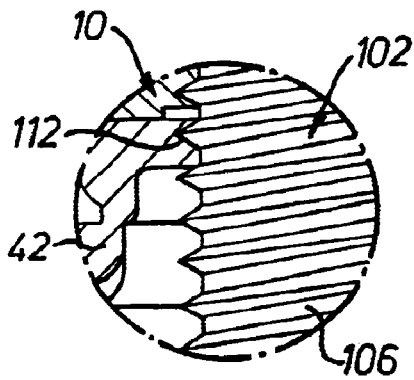

FIG. 11 shows how a thread turn 112 of the shaft part 106 of the screw 102 has formed a corresponding thread turn into the sheet metal part 42. Instead of a thread-forming screw a thread cutting screw can also be used.

Figure 12:
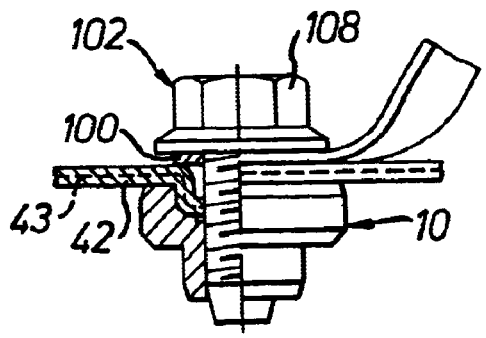

FIG. 12 shows a further possibility of attachment of the screw. Here, the head part 108 of the screw is located on the side of the sheet metal part remote from the nut element 10. Here, the electrical connection also extends from the terminal lug via the screw into the sheet metal part. The arrangement of FIG. 12 has the additional advantage that the screw aids the connection between the hollow fastener element 10 and the sheet metal part 42, however, requires under some circumstances a somewhat larger area design of the terminal lug 100 or of the contact surface of the head part 108 of the screw, so that the surface pressure at the terminal lug or at the screw remains within reasonable limits. Otherwise, all the details given for the embodiment of FIG. 9 also apply for the embodiment of FIG. 12. That is to say, amongst other things, that a thread-forming or thread-cutting screw can be used.

The electrical connection in accordance with the present teaching cannot only be achieved with an element in accordance with the European application EP-A-0 759 510 A1. Basically, all known nut elements and sheet metal connections can be considered where the possibility exists of allowing the sheet metal part to remain in the region of the corresponding passage opening of the hollow fastener element and to provide it with a hole which corresponds at least substantially to the core diameter of the thread of the screw. In other words, the present invention can be used at least with fastener element sheet metal connections, such as a are described in German patent 34 01 118, in European patent 0 533 822, in European patent 0 669 473 or in the not yet published European patent application 97 116 188.0.

The above named protective rights are those which originate from the company Profil Verbindungstechnik GmbH & Co. KG or in which Profil has obtained rights. However, competing products can also be modified in order to make use of the present invention. For example, the element shown in the European patent EP-B-0 663 247 could be modified to realise a component assembly in accordance with the present application.

In order to further explain these concepts, reference is made in the following to FIGS. 13 and 14.

Figure 13:
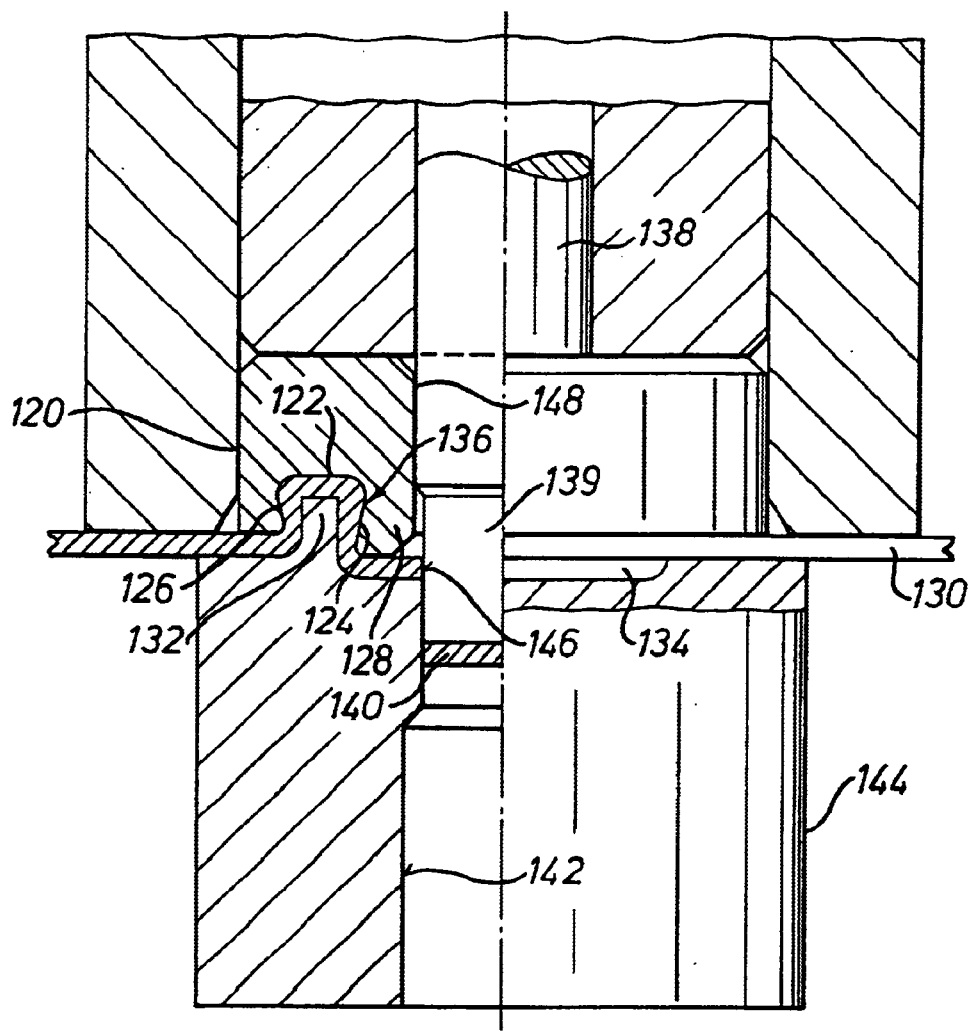

FIG. 13 shows in principle the nut element of European patent 0 533 822, the drawing of which can, however, also be regarded as representative for the nut elements of the European patent application EP-A-669 473 or the European patent EP-B-663 247. The element shown here with the reference numeral 120 has a ring-like recess 122 with a radially inner side wall 124 and a radially outer side wall 126, with the radially inner side wall of the ring-like recess 122 representing the radially outer wall of a cylindrical projection or pilot 128 which served in the previous use of the nut element as a cylindrical punch section. Important with an element of this kind is that either the radially outer side wall 126 and/or the radially inner side wall 124 is undercut at least locally, so that the entrance to the ring-like recess 122 in the region of the contact surface of the corresponding element 120 against the sheet metal part 130 is smaller than the base surface of the ring-like recess 122, in order to enable a corresponding hooked engagement with the sheet metal part. The die button has a ring-like nose 132 which on the attachment of the element pushes sheet metal material into the ring-like recess 122. Various form-giving possibilities exist in order to bring about a security against rotation. These are, however, not an element of the present invention and are explained per se in the named patent specifications or application papers. They will not be explained in more detail here.

Important in the present embodiment are two features.

On the one hand, the die button is provided at its end face with a ring-like recess 134, so that during the production of the connection between the element and the sheet metal part the cylindrical cross-section 128 cannot execute any punching action, but rather so presses the sheet metal part that a pot-like recess 136 arises.

In this embodiment a follow-up hole punch is used. That is to say, after the production of the connection in accordance with FIG. 13, the hole punch 138, which is designed in accordance with the hole punch 48 of the embodiment of FIGS. 1 to 8 and which has a cylindrical region of smaller diameter 139, is pressed downwardly, so that the diameter of a smaller section at the front end of the hole punch punches out a slug 140 out of the sheet metal part 130 in conjunction with the die button and the slug 140 can be disposed off via the central passage 142 of the die button 144 in the customary way and means. During this process the front section 139 of the hole punch forms a circular opening 146 in the sheet metal part 130 with a diameter which is fractionally smaller than the inner diameter of the central passage 148 of the hollow fastener element 120 which has not yet been provided with a thread. Here, no broadening of the punched hole is to be expected or necessary since the sheet metal part 130 already has its final form-fitted connection to the fastener element 120.

Figure 14:
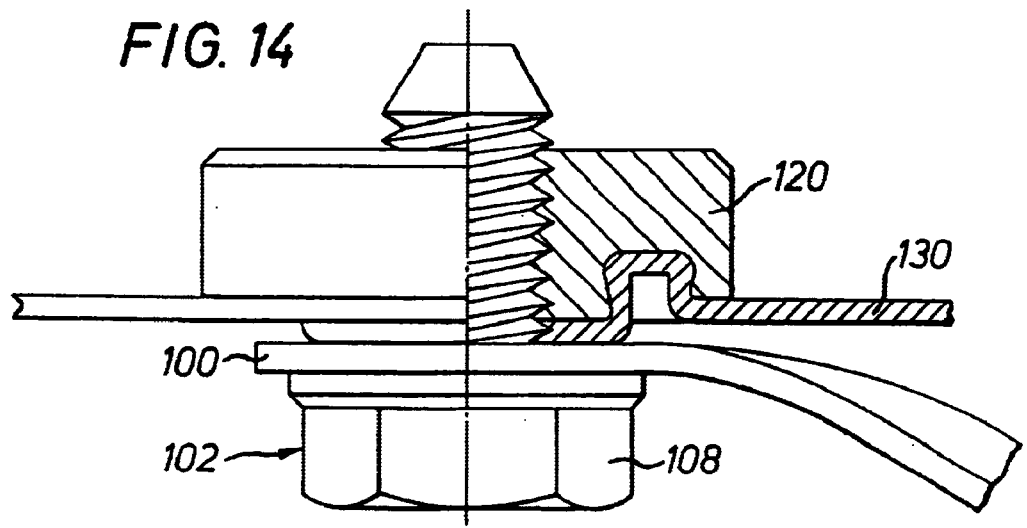

After the removal of the component assembly from the press, i.e. the component assembly comprising the sheet metal part 130 with the nut element 120 riveted to it, a terminal lug or a connection terminal 100 can be secured to the component assembly by means of a corresponding screw 102, as shown in FIG. 14. During this the thread-cutting or thread-forming screw 102 cuts or forms a thread both in the sheet metal part 130 and also in the wall of the central passage 148 of the hollow fastener element 120, so that a high quality electrical connection is produced which extends from the terminal lug via the screw into the sheet metal part 130. Since the lower surface in FIG. 14 of the cylindrical section 128 of the hollow fastener element 120 projects somewhat further downwardly than the contact surface in the edge region of the hollow fastener element 120 it is ensured that the terminal lug 100 has a contact with the central part of the sheet metal part and thus ensures an adequate contact pressure force between the head part 108 of the screw and the terminal lug 100, which favours the electrical connection. A spring washer provided with points could also be used here should one consider this to be necessary.

Basically, in the embodiment of FIG. 14, the screw could also be introduced from the other side, as shown in the FIG. 10 embodiment.

If the screw produces both the thread in the nut element 120 and also in the sheet metal part, then the connection between the hollow fastener element 120 and the sheet metal part must have sufficient strength so that the corresponding torque, which arises during the thread cutting or thread forming, does not lead to loosening of the connection between the element 120 and the sheet metal part 130.

Even though the previously described embodiments always operated using a preceding hole punch or a follow-up hole punch, the possibility ultimately also exists of producing the corresponding hole in the sheet metal part by means of a thread boring screw which must be correspondingly positioned or guided, for which the hollow passage or the thread cylinder of the fastener element could serve, however, this embodiment does not stand in the foreground of the present interest, since the danger has to be tolerated that the sheet metal part could separate from the nut element.

What is claimed is:

1. A method of forming an electrical connection to a panel having a generally nonconductive protective layer, comprising the following steps:

attaching a self-attaching fastener having a prethreaded bore to said panel having a generally nonconductive protective layer by deforming a portion of said panel into a groove in said self-attaching fastener and forming an opening through said panel coaxially aligned with said prethreaded bore of said self-attaching fastener having an internal diameter less than a crest diameter of said prethreaded bore;

inserting a screw including an externally threaded shank portion having a diameter greater that said opening in said panel through an opening in a terminal lug having a diameter greater than said diameter of said shank portion; and then, threading said externally threaded shank portion through said prethreaded bore of said self attaching fastener and finally treading said shank portion through said opening through said panel, thereby threading said opening through said panel and forming an electrical contact between said panel and said terminal lug through said screw.

2. The method of forming an electrical connection to a panel as defined in claim 1, wherein said method includes forming said opening in said panel prior to attaching said fastener to said panel.

3. The method of forming an electrical connection to a panel as defined in claim 1, wherein said method includes piercing said opening in said panel substantially simultaneously with attaching said self-attaching fastener to said panel.

4. The method of forming an electrical connection to a panel as defined in claim 1, wherein said method includes forming said opening in said panel subsequent to attaching said self-attaching fastener to said panel.

5. The method of forming an electrical connection to a panel as defined in claim 4, wherein said method includes piercing said opening in said panel by driving a punch through said prethreaded bore of said self-attaching fastener.

6. The method of forming an electrical connection to a panel as defined in claim 1, wherein said method includes forming said opening in said panel with a circular punch forming a circular opening in said panel having an internal diameter substantially equal to a core diameter of said prethreaded bore in said self-attaching fastener.

7. The method of forming an electrical connection to a panel as defined in claim 1, wherein said screw includes a head portion having a diameter greater than said externally threaded shank portion and said method includes threading said externally threaded shank portion through said prethreaded bore of said self-attaching fastener, driving said head portion against said terminal lug and clamping said lug.

* * * * *